March 13, 1951     C. D. JONES     2,545,284
WELDING MACHINE
Filed March 30, 1949     6 Sheets-Sheet 1

INVENTOR
Clevoe D. Jones
ATTORNEYS.

March 13, 1951 C. D. JONES 2,545,284
WELDING MACHINE
Filed March 30, 1949 6 Sheets-Sheet 3
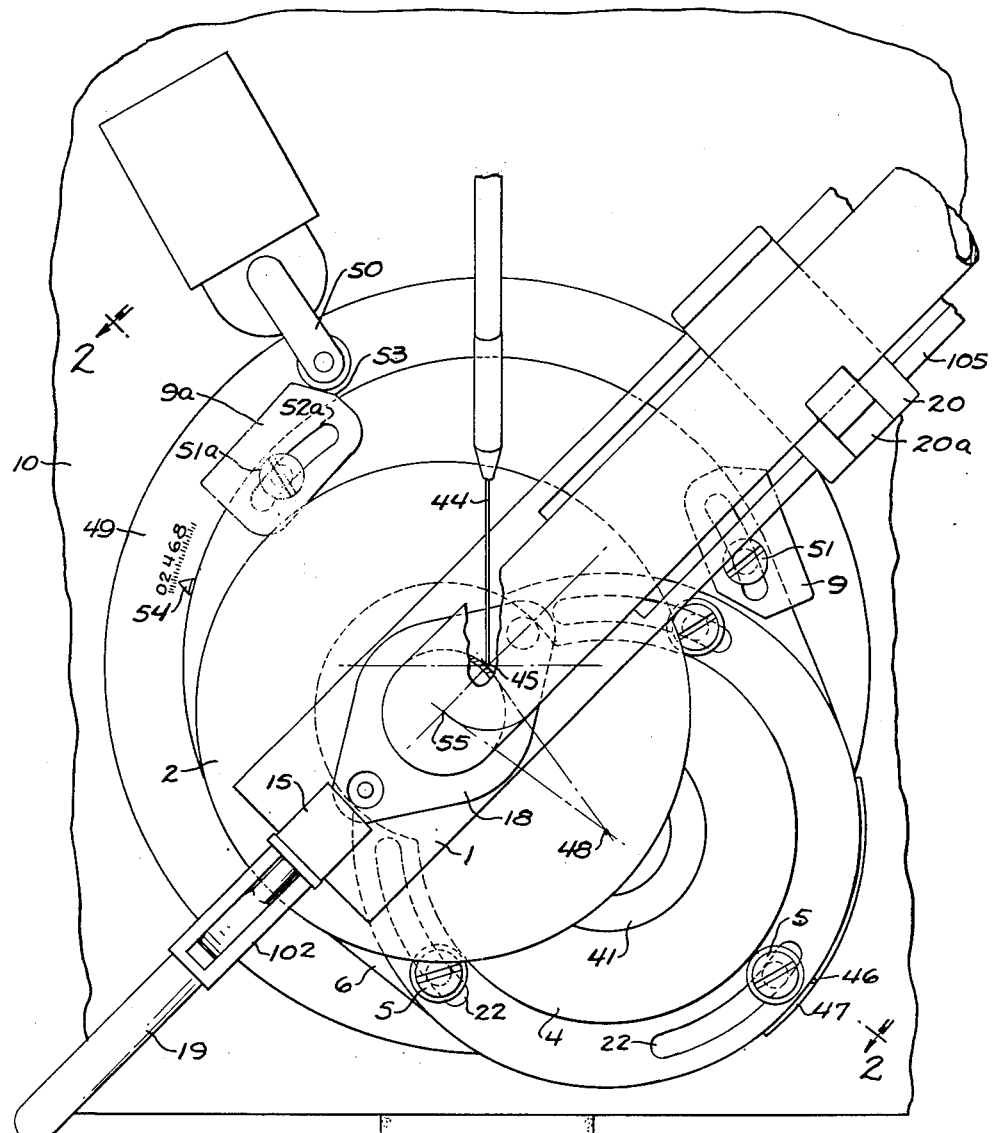
Fig. 3.
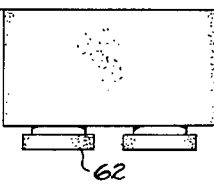
Fig. 5.
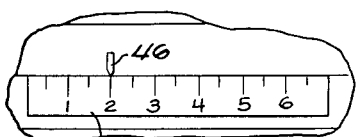
Fig. 6.
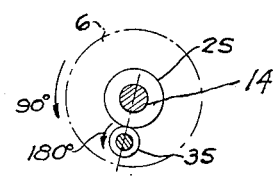
Fig. 4.
INVENTOR
Clevoe D. Jones
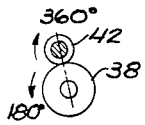
ATTORNEYS.

March 13, 1951  C. D. JONES  2,545,284
WELDING MACHINE
Filed March 30, 1949  6 Sheets-Sheet 4

INVENTOR
Clevoe D. Jones
BY Barnes, Kisselle, Laughlin & Raisch
ATTORNEYS.

March 13, 1951  C. D. JONES  2,545,284
WELDING MACHINE
Filed March 30, 1949  6 Sheets-Sheet 5

INVENTOR
Clevoe D. Jones
BY
Barnes, Kisselle, Laughlin & Raisch
ATTORNEYS.

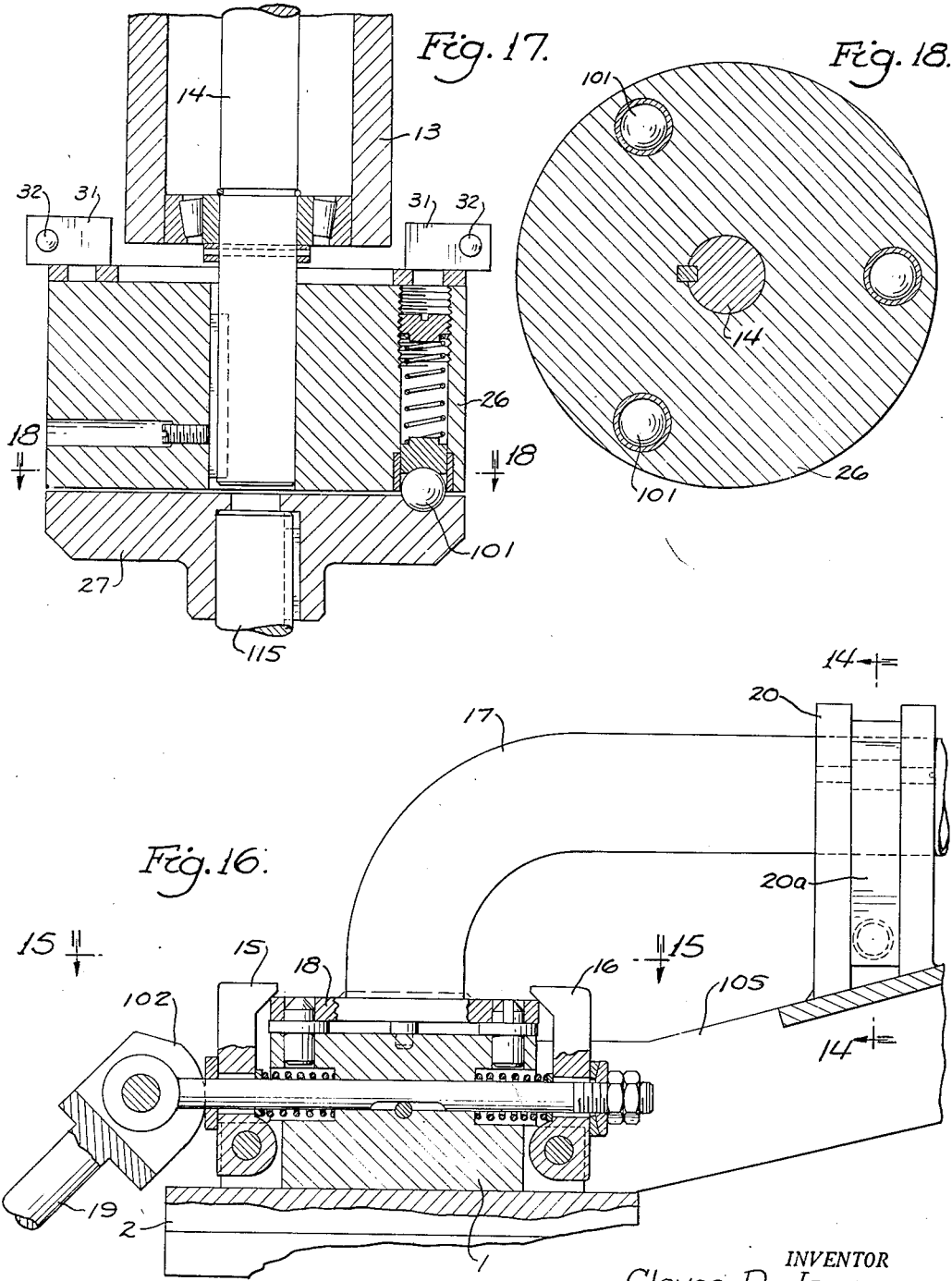

Patented Mar. 13, 1951

2,545,284

UNITED STATES PATENT OFFICE 2,545,284

WELDING MACHINE

Clevoe D. Jones, Royal Oak, Mich., assignor to Michigan Steel Tube Products Company, Detroit, Mich., a corporation of Michigan Application March 30, 1949, Serial No. 84,389

8 Claims. (Cl. 219—8)

This invention relates to an arc welding machine or other machines carrying tools past which a piece of work is caused to rotate. It is the object of the invention to provide a welder which has a stationary head which carries the apparatus for feeding the arc welding wire or rod to the work or for supporting an electrode of a spot or line welder. The work is carried upon a table which has two movements, one a rotating movement through 360°, the other movement an orbital movement of 90° in the opposite direction on a center which is at the point of the welding rod or electrode. By this rolling movement of the work around the welding point, the manifold or other piece of work which is being welded will not swing against the stationary welding fixture. Where an exhaust manifold is to have a flange welded to it, the manifold and supporting fixture starts at one side of the welding fixture and ends up at the other side of the fixture with ample clearance between the manifold and the fixture at either side. This is effected by this compound turning and orbital movement of the work which is achieved by an epicyclic gear system.

Limit switches are provided at either end of the movement and also reversing switches so that the work is swung first clockwise, then is reversed to swing counter clockwise after the second piece of work has been clamped in the work holder and the machine is started again. There is also provided an overload clutch so that if anybody or anything gets in the way of the swinging manifold, the driving mechanism will automatically be disconnected so that no harm will be done.

Gauges and adjustments are provided for the purpose of locating the center of the work on the table, the correct distance off the center of the rotating drive shaft and off the point where the welding rod comes in contact with the work.

Figure 3 is an enlarged plan view of the work holder, the work supporting table and the rotating heads which provide the combined rotation and orbital movement of the work.

Figure 4 is a fragmentary side elevation of the machine showing the scale by which the upper rotating head is adjusted to proper distance off center to provide the correct orbital movement of the work.

Figure 5 is a diagrammatical view of the lower or planetary gear set.

Figure 6 is a diagrammatical view of the upper gear set.

Figure 16 is an elevation, partly in section, of the same part of the fixture.

Figure 17 is a vertical section through the over running clutch.

Figure 18 is a cross section on the line 18—18 of Figure 17.

Figure 12:
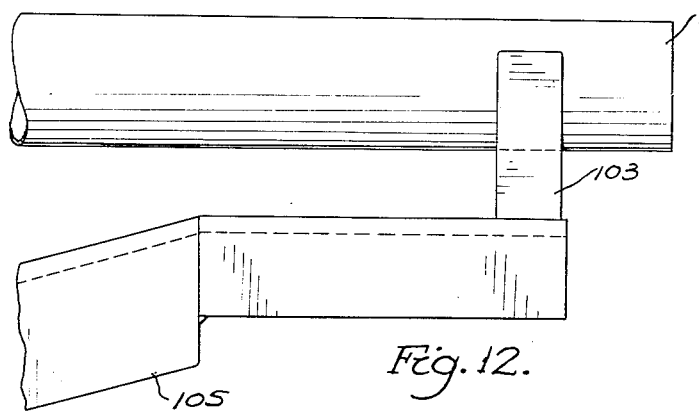
Figure 12 is a fragmentary elevation of the work carrying fixture arm.
Figure 13:
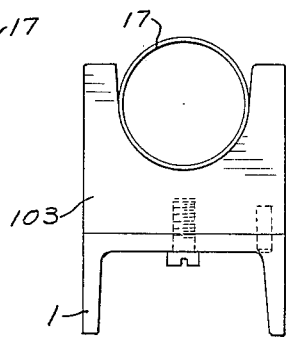
Figure 13 is an end elevation of the same.
Figure 15:
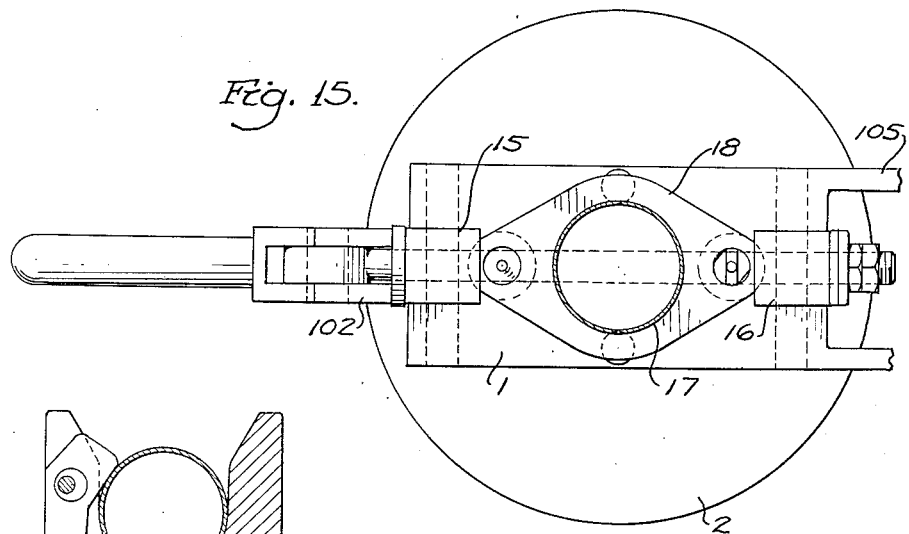
Figure 15 is a plan view of the part of the fixture that clamps the flange.
Figure 14:
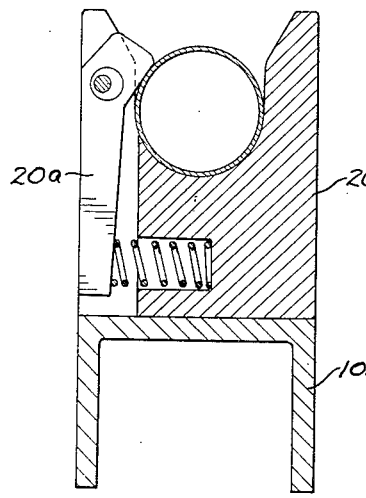
Figure 14 is a section through the work carrying fixture where the work is clamped in place by means of a cradle and a spring arm.

1 is the work holder which includes the arm 105 for supporting the manifold. The clamping hooks 15 and 16 which engage the flange 18 hold it in position for welding (see Figures 15 and 16). These hooks are operated by a cam 102 and clamping lever 19 (see Figure 16). The manifold tube 17 is a tube with a bent over end. The straight portion of the manifold is held in a cradle 20 by a spring clamp 20a (Figure 14). This fixture supports the bent end of the manifold in contact with the flange 18. The end of the manifold is laid in saddle 103 (Figures 12 and 13). This work holder 1 is secured upon table 2 which is bolted to table 2a. This table 2a has integral therewith a driven shaft 43 which is rotatably supported in a journal bearing housing 21 which rises from the swinging head 4. This head 4 can be adjustably bolted to the lower head 6 by means of the bolts 5 which pass through segmental slots 22 in the lower table 4.

10 is the bed of the machine which supports a roller bearing 23 which journals the drive shaft 14. 11 is a stationary table bolted to the bed 10 and which supports the sun gear 25. The drive shaft 14 is fastened to the upper head 26 of the overload clutch. The lower head 27 of the overload clutch is tied to the upper head 26 by means of a ball form of detent 101 as shown in Figures 17 and 18. When the swinging arm or tubular part of the work meets an obstruction, the clutch is disengaged by reason of the ball and detent connection between the two heads. Consequently the rotation of the motor and the drive shaft 115 may continue while the work fixture, work and the connected heads are stopped by the obstacle encountered. An electrical motor M through the shaft 28 drives a gear set (not shown) in the speed reducing gear housing 29. There is a very large speed reduction, some 200 or more to 1, so that the motor armature turns at a rather high speed while the turning of the shaft 115 is comparatively slow.

Figure 2:
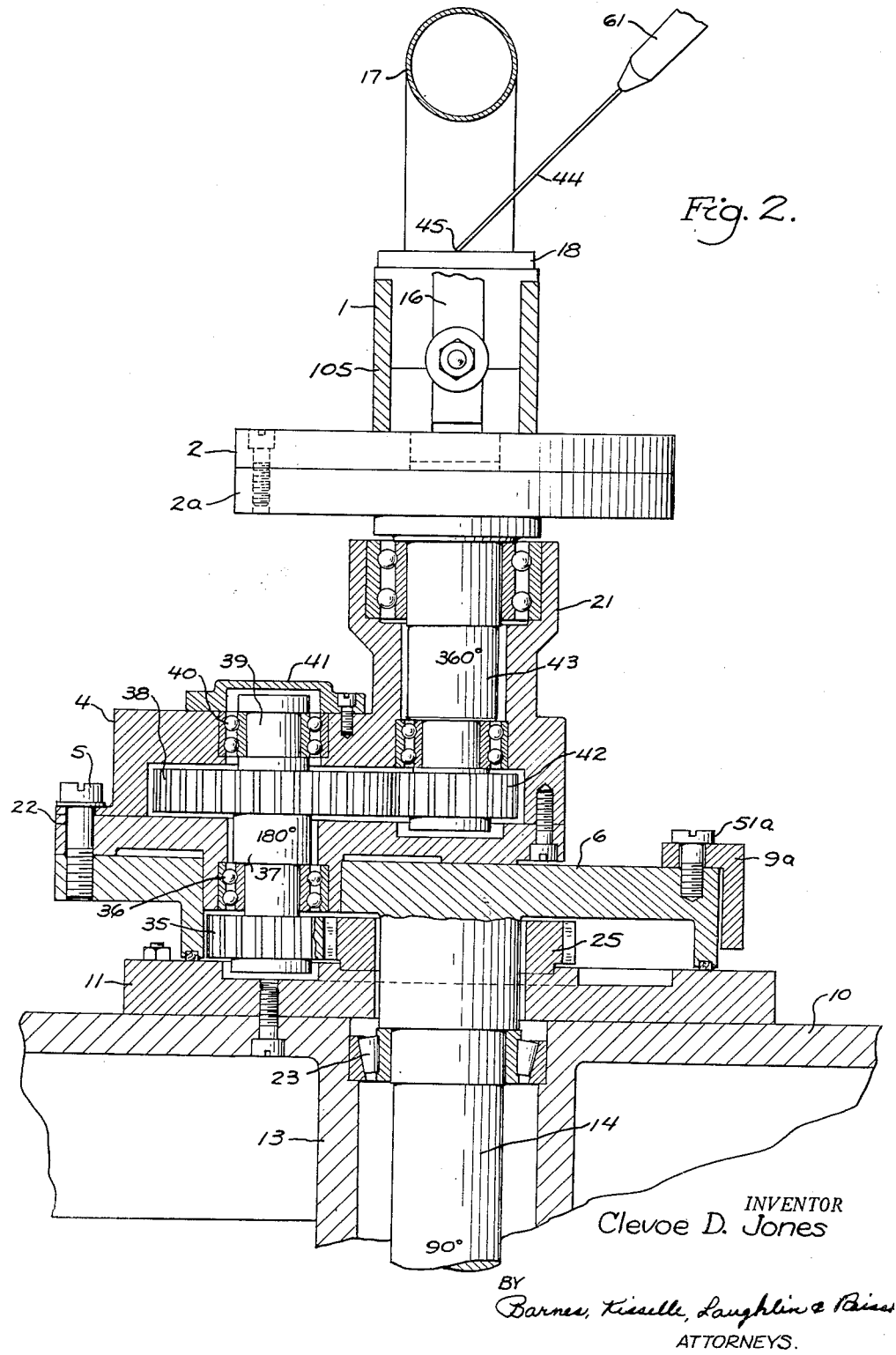
Figure 2 is an enlarged view of the top portion of the machine partly elevational and partly sectional.

Now to describe the shaft and gear movements: Motor M through shaft 28 and the reduction gears in the gear housing 29 drive the shaft 115 at a large speed reduction. Shaft 115 through the two overload clutch heads 26 and 27 drive shaft 14 which is shown in enlarged form in Figure 2. Shaft 14 journaled in the roller bearings 23 rotates only 90° (see Figure 11). On the top of the upper head 26 of the overload clutch is a plate 7 (Figure 11) which is adjustable on the upper head 26 by means of screws 8 passing through slots 30. This allows the strikers 31 on the plate 7 to be adjusted with respect to the rotating head 26 to correctly time the stopping of the machine. Each striker also has an adjustable contact screw 32. The ends of these set screws encounter the limit switch arms 33 and 34. This arrangement provides an accurate timing of the 90° arc of movement of the overload clutch head 26. As already stated, the drive shaft 14 is coupled with the overload clutch head 26 to rotate therewith. Drive shaft 14 has at its upper end the driving head 6. Upper head 4 is adjustable about the center line of the planetary gear 35 by means of the bolts 5 which pass through the arcuate slots 22 (see Figure 3). These slots 22 are described on a radius which is at the center line of the planetary gear 35. The planetary gear 35 is supported in the ball bearing 36 (see Figure 2) located in the lower head 6. A shaft 37 connects gear 35 with the planetary driven gear 38 which in turn has a stub shaft 39 supported in the upper head 4 by ball bearings 40. A cap 41 fits over the end of the stub shaft and this ball bearing 40 and is bolted to head 4.

Figure 1:
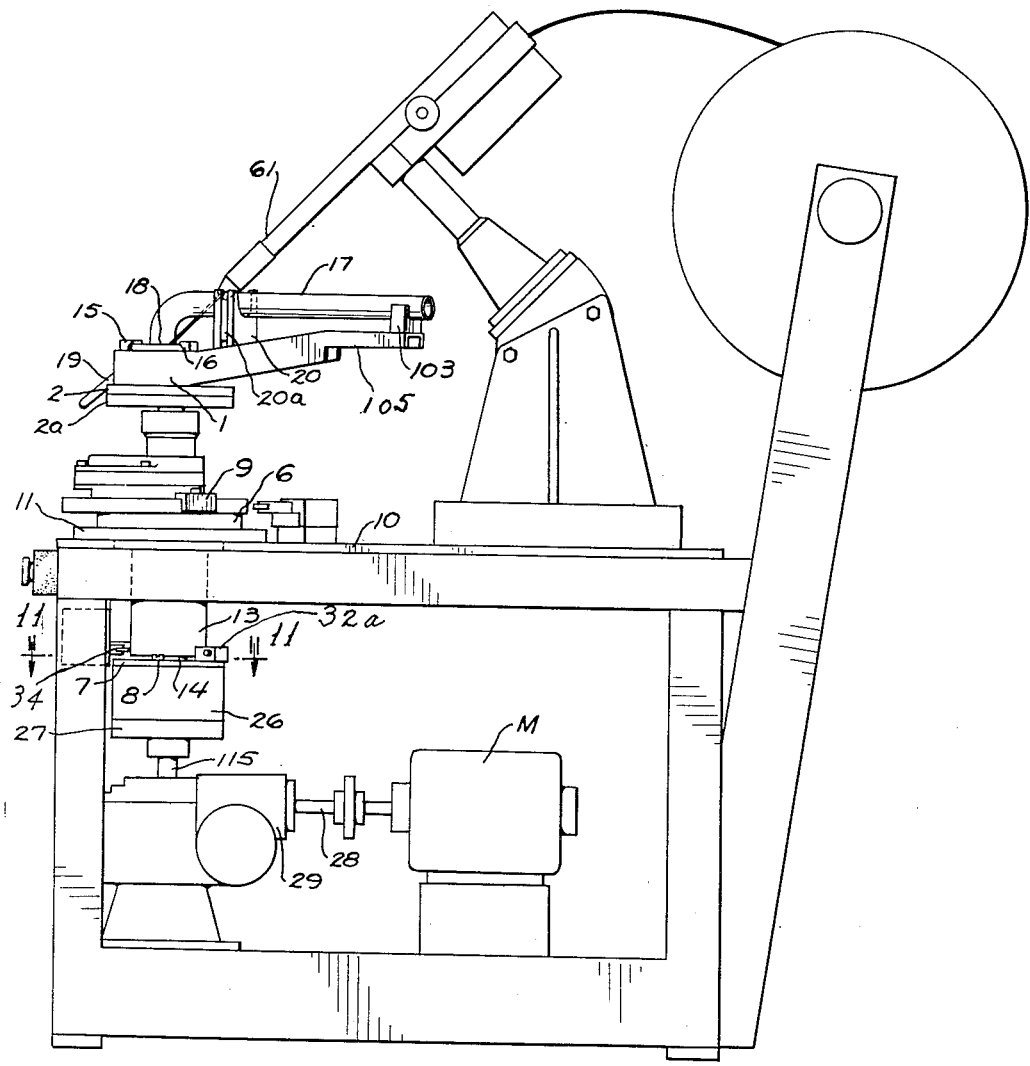
Figure 1 is a side elevation of the machine.
Figure 11:
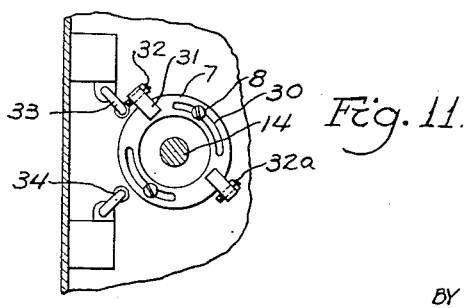
Figure 11 is a section taken on the line 11—11 of Figure 1.

Referring to Figure 5 and Figure 11, it will be seen that the movement of the shaft 14 and the driving head 6 on the shaft is only 90°. There is two to one ratio between the driven planetary gear 38 and the driving planetary gear 35. The driving head 6 rotating through 90° (see Figure 5) causes the planetary gear 35 to roll over the sun gear 25 which has twice the number of teeth that the planetary gear has. This causes a 180° rotation of the planetary gear (see Figure 5). Planetary gear 35 drives the driven planetary gear 180° and this driven planetary gear in turn drives the driven pinion 42 360° (see Figure 6). The driven planetary gear 38 has a two to one ratio with the driven pinion 42, hence the driven shaft 43 is driven 360° while the drive shaft 14 turns only 90°. Hence the work table 2 is turned 360° while the upper head 4 which is bolted to the driving head 6 turns only 90°.

If the driving head 6 is moving counter clockwise, the work table 2 will move clockwise. This is because when the gear 35 travels around the sun gear 25 this gear will rotate counter clockwise or in the same direction as the driving head 6. Driven planetary gear 38 will turn counter clockwise, but inasmuch as this is geared to the driven pinion 42, this member will be turned clockwise. This will cause the work table 2 to turn clockwise while the driving head 4 turns counter clockwise.

The welding rod 44 has its welding point on the center line of the driving shaft 14. This is the point 45 (see Figures 2 and 3). When the pointer 46 points to zero on gauge 47 (Figure 4) the center line of the work will be on the center line of the driving shaft 14. In order to set the work, which is here a tube, to rotate past the welding point 45 of the welding rod 44, it is necessary to offset the center of the tube one half (½) its diameter from the center line of the drive shaft 14. For instance, if the diameter of the tube is 2 inches, the bolts 5 will be released and the head 4 will be adjusted around its center 48 (see Figure 3) until pointer 46 points to the numeral "2" on the scale 47 (Figure 4). This will mean that the work table 2 has been adjusted one inch from the point 45 to point 55 (Figure 3), or the distance of the radius of the tube. A second adjustment now has to be made that relates to the scale on the bed 11 of the machine, which scale is designated 49 in Figure 3. When the head 4 is adjusted the strikers 9 and 9a which engage the reversing switch arm 50 will need to be relocated on the head 6 as will later be described.

Figures 7, 8:
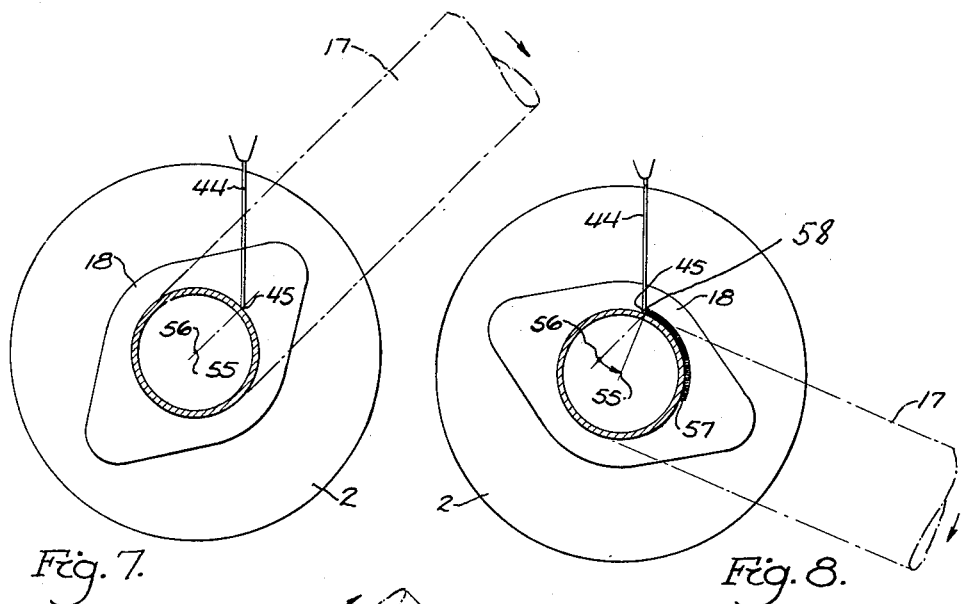
Figure 7 is a diagrammatical view showing the tubular manifold and the flange in the first welding position.
Figure 8 shows the same parts after the work has turned 90° and has traveled one-quarter (¼) of 90° in its counter orbital movement.
Figures 9, 10:
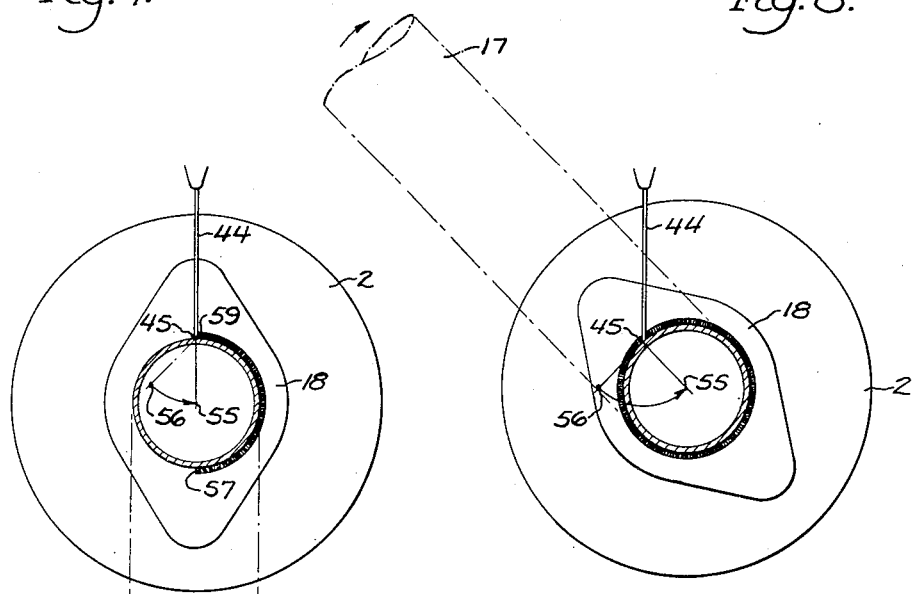
Figure 9 is a diagrammatical view of the same parts after the work table has rotated through a 180° arc has been carried 45° in an orbital movement.
Figure 10 shows the same parts after the complete 360° rotation of the work and the 90° orbital movement.

When the center of the work, namely, the point 55 (Figure 3) is offset from the welding point 45, and the center line of the drive shaft as shown in Figure 3, the work rotates through 360° by reason of the gear train shown in Figures 5 and 6. But the work is also moved in an orbital path through 90° as shown by comparing Figures 7 to 10 inclusive. In the first stage of the movement shown in Figure 8, the center 55 is moved from the horizontal center line shown in Figure 7, point 56 to point 55. That is, there has been an orbital movement of the rotating work and the table 22½°. In the meantime, the weld has been made from the point 57 to the point 58 or 90° around the exterior of the tube. In Figure 9 where the weld has been made through 180° from point 57 to point 59, there has been a roll of the tube of 180° and a weld of 180°, but the paradox is that the work fixture arm and manifold 17 has not swung through 180°. When looking down in a plan view and comparing the position of the manifold in Figure 7 with that in Figure 9, it will be seen that it has traveled only 135°. So in Figure 10 where the roll of the work has been 360° and the arc welding line 360°, the position of the manifold tube is 270° from the position of the manifold tube in Figure 7. The center 55 of the work has traveled from the position 56 to the position 55 in Figure 10 through one-fourth (¼) of a turn. The upper head 4 and the lower head 6 have been swinging on a center which is the welding point 45 but in a direction opposite to the rotation of the upper work table 2 which has been rotating on the center 55. This is a very difficult compounding of movements to visualize and understand, but the fact is, as shown in comparison of Figures 7 to 10 inclusive, that while the flange and the manifold tube have in fact rotated a full 360° on the swinging center 55, this center 55 has traveled counter direction through one-fourth (¼) of a turn as shown in Figure 10 so the final position of the flange and the manifold ends up 270° from where it began in Figure 7. Consequently there is a 90° arc through which the bent manifold does not travel. That is, there is 90° of free space on the machine in which to locate the welding head 61 and the welding rod as shown at 44. It will be seen by comparing Figures 2 and 3 that the welding rod 44 reaches in under the bend in the manifold and first contacts the work to be welded at the side of the tube. As the tube rotates and presents the welding seam, the whole work holder travels in a circular orbit, the center of which is the contact point of the welding rod, and consequently while the work is rotating through a complete 360° on its own center, the work is being bodily carried in the opposite direction in an orbit of 90°. The upshot of the whole compound movement is that the work center, which in the initial position (Figure 7) was on a 45° oblique line through the welding point and spaced the radius of the tube from the welding point, ends up 90° removed from this position with the work center on a 45° oblique line through the welding point. This is made possible by the epicyclic gear train shown in Figure 2 in which the driving head 6 swings through 90° on the center of the driving shaft 14 rotating the planetary gear 38 in the same direction 180° and then the gear 38 rotates the gear 41 and the table through 360° in the opposite direction.

In setting up the machine (Figure 3), the head 4 is adjusted on head 6 so that the center of the manifold tube 55 is moved from weld contact point 45 and around the center 48 a distance equal to ½ the outside diameter of the tube. Bolts 5 are then clamped tightly in place and we have the proper offsetting of the center of the work table with respect to the drive shaft 14 and the welding point 45. Now it becomes necessary to adjust the strikers to properly trip the limit switches and the reversing switches. First the bolt 51a is released and the striker 9a is adjusted to a position to trip the reversing switch arm 50 when the indicator 54 is at point "2" on the scale 49. This assures the proper timing of the reversal.

The bolts 8 on the plate 7 (Figure 11) are loosened and the plate moved so that one of the strikers 32 contacts the limit switch 33 at, or just before, the reversing switch is tripped by the striker 9a. This insures the cut-off of the motor just before, or at the same time the reversing switch is tripped. The motor, however, cannot be started again until the starter switch 62 is pressed in and will only be started after the welded work has been taken out of the work clamp and the new flange and the new manifold tube placed in the work fixture. To complete the setting up, the table is then rotated by the motor through 360° in the opposite direction. This will carry the head 6 through 90° in the direction opposite the rotation of the table. To get the adjustment of the other striker block 9, bolt 51 and the rotating parts are moved until the striker 32a strikes the limit switch 34, then striker 9 is adjusted with the aid of the bolt 51 so that it will throw the reversing switch arm 50 at or just after the striker 32a has thrown the limit switch 34.

The set screws 32 and 32a may be so set that the machine welds slightly more than 360° or a slight overlap.

With pointer 46 at zero (Figure 4) on scale 47, no orbital movement will take place. Then plain circles (i. e. work without a protruding arm) may be welded with the rod always having an angular position of 90° to a tangent through the weld point.

In the claims a welding rod is named. Welding rods are ordinarily associated with arc welding. We desire it to be understood that the welding rod might be a welding tip or roller used in electric resistance welding such as spot or line welding.

The invention here described and claimed is obviously capable of a wider application than an arc welding or some other welding tool. The tool past which the work rotates and also swings in an orbit might well be a cutting tool or some other tool. Accordingly, the claims are not limited to a welding tool or a welding machine.

What I claim is:

1. A machine having in combination a tool and fixture having a fixed position, a work carrying table having a 360° rotating movement and also a limited orbital movement about the end of the tool as a center in a direction counter to the rotational movement, means for giving the table such combined rotational and orbital movement comprising a swinging head for journaling the table and which can be set to have the axis on which the table rotates offset from the axis on which the head turns to cause the work to turn and roll around the end of the tool, and driving means to simultaneously turn the table 360° and the head only part of a turn, whereby work with a sidewise projecting part is given a full rotation with respect to the tool but the orbital movement will carry the sidewise projecting part to a position clear of the fixture notwithstanding the work is so shaped that with a full 360° turn about a fixed axis the part would collide with the fixture.

2. A machine having in combination a tool and fixture having a fixed position, a work carrying table having a 360° rotating movement and also a limited orbital movement about the end of the tool as a center in a direction counter to the rotational movement, means for giving the table such combined rotational and orbital movement comprising a swinging head for journaling the table and which can be set to have the axis on which the table rotates offset from the axis on which the head turns to cause the work to turn and roll around the end of the tool, driving means to simultaneously turn the table 360° and the head only part of a turn, an under head, a shaft secured to the under head, the first mentioned swinging head being adjustable by bolts and segmental slots on the under head to offset the work table axis of revolution from the axis on which the two heads swing to cause work with a sidewise projecting arm to travel on an orbit around the end of the tool as a center whereby the work is given a full rotation with respect to the tool but the orbital movement will carry the projecting arm of the work to a position clear of the fixture notwithstanding the work with the arm is so shaped that with a full 360° turn about a fixed axis the arm would collide with the fixture.

3. A machine having in combination a tool and fixture having a fixed position, a work carrying table having a 360° rotating movement and also a limited orbital movement about the end of the tool as a center in a direction counter to the rotational movement, means for giving the table such combined rotational and orbital movement comprising a swinging head for journaling the table and which can be set to have the axis on which the table rotates offset from the axis on which the head turns to cause work with a sidewise projecting part to turn and roll around the end of the tool, driving means to simultaneously turn the table 360° and the head only part of a turn, said driving means, said table and head having driving connections comprising an epicyclic gear set, whereby the work is given a full rotation with respect to the tool but the orbital movement will carry the sidewise projecting part of the work to a position clear of the fixture notwithstanding the work with the sidewise projecting part is so shaped that with a full 360° turn about a fixed axis the part would collide with the fixture.

4. A machine having in combination a tool and fixture having a fixed position, a work carrying table having a 360° rotating movement and also a limited orbital movement about the end of the tool as a center in a direction counter to the rotational movement, means for giving the table such combined rotational and orbital movement comprising a swinging head for journaling the table and which can be set to have the axis on which the head turns to cause the work to turn and roll around the end of the tool, driving means to simultaneously turn the table 360° and the head only part of a turn, said driving means, said table and head having driving connections comprising an epicyclic gear set, said epicyclic gear set comprising a fixed sun gear, a smaller planetary drive gear on the head traveling around said sun gear, a drive shaft for the head with power means to turn the shaft a part turn, a second planetary drive gear on the head having a shaft connection with the first planetary gear and substantially larger than the first gear, and a smaller driven gear on the head having a shaft connection to rotate the said work table a greater number of degrees than the swinging of the said head, whereby the work is given a full rotation with respect to the tool but the orbital movement will carry the work to a position clear of the fixture notwithstanding the work is so shaped that with a full 360° turn about a fixed axis it would collide with the fixture.

5. A machine having in combination a tool and fixture having a fixed position, a work carrying table having a 360° rotating movement and also a limited orbital movement about the end of the tool as a center in a direction counter to the rotational movement, means for giving the table such combined rotational and orbital movement comprising a swinging head for journalling the table and which can be set to have the axis on which the table rotates offset from the axis on which the head turns to cause the work to turn and roll around the end of the tool, and driving means to simultaneously turn the table 360° and and the head only part of a turn, said driving means, said table and head having driving connections comprising an epicyclic gear set having a fixed sun gear, a planetary gear on the head half the size of the sun gear arranged to travel around the sun gear, a drive shaft for the head with power means and limit switches to turn the shaft and head 90°, a second planetary gear twice the size of the first planetary gear located on said head and coaxially tied to said first planetary gear, and a third gear one half the size of said second planetary gear and meshing therewith, said gear having a shaft connection with the table to rotate the same 360° in one direction while the drive shaft swings the work table 90° in the opposite direction.

6. The combination claimed in claim 1 with a pair of limit switches and an adjustable plate secured on the head carrying two strikers to engage the limit switches, thereby determining the arc of travel in the swinging orbital movement.

7. The combination claimed in claim 1 in which adjustable strikers are placed on the head and motor reversing switches are provided to be hit by the adjustable strikers to reverse the motor.

8. The combination claimed in claim 1 in which a pair of limit switches for stopping the motors are arranged to be struck by strikers, a pair of reversing switches are provided, and a second pair of strikers are provided on the head that has the swinging movement to strike the reversing switches and throw them after the limit switches have been thrown by the first pair of strikers.

CLEVOE D. JONES.

REFERENCES CITED

The following references are of record in the file of this patent:

UNITED STATES PATENTS

| Number | Name | Date |
|---|---|---|
| 180,584 | Hipwell | Aug. 1, 1876 |
| 1,550,651 | Charter | Aug. 18, 1925 |
| 1,886,503 | Shockey | Nov. 8, 1932 |
| 1,949,251 | Gilbert | Feb. 27, 1934 |
| 2,030,689 | Dorrat | Feb. 11, 1936 |
| 2,309,080 | Hunt | Jan. 19, 1943 |
| 2,408,204 | Early | Sept. 24, 1946 |
| 2,507,998 | Russell | May 16, 1950 |